Aug. 17, 1943.  L. R. BUCKENDALE  2,326,751
MULTISPEED DRIVE AXLE
Filed Oct. 3, 1941
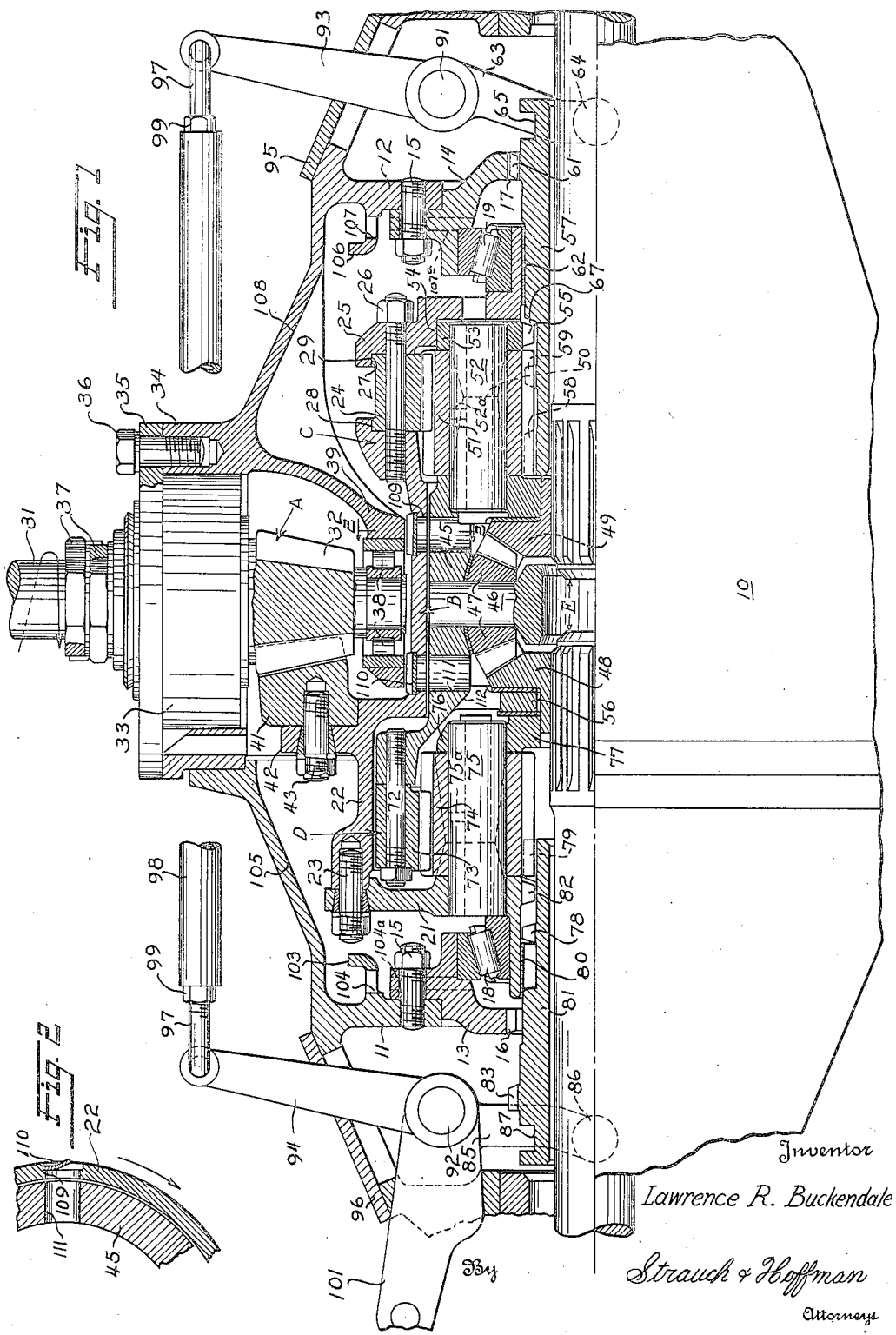
Inventor
Lawrence R. Buckendale
Strauch & Hoffman
Attorneys Patented Aug. 17, 1943

2,326,751

UNITED STATES PATENT OFFICE 2,326,751

MULTISPEED DRIVE AXLE

Lawrence R. Buckendale, Detroit, Mich., assignor to The Timken-Detroit Axle Company, Detroit, Mich., a corporation of Ohio Application October 3, 1941, Serial No. 413,537

14 Claims. (Cl. 74—314)

The present invention relates to power transmitting mechanisms and more particularly to multi-speed planetary drive axles for automotive vehicles, but it is not limited to such use.

Although so-called two speed planetary drive axles have been in use for many years on trucks and other heavy commercial vehicles, and in recent years have been used in the pleasure car field to afford an overdrive at the higher or cruising speeds, they leave much to be desired because they merely afford two different driving ratios and are insufficiently flexible to meet all driving conditions. In truck axles the unit is usually an underdrive unit, so as to provide a gear reduction below that of the ring gear and pinion, for pulling heavy loads, and which may be shifted into direct drive when the load decreases. In pleasure cars an overdrive unit is usually employed, for driving at the higher or cruising speeds, and is shiftable into direct drive for city driving.

It is the major object of this invention to provide a novel planetary power transmitting mechanism embodying means for transmitting power selectively at either an underdrive or overdrive ratio.

Another important object is to provide a drive mechanism embodying a plurality of planetary units providing several different geared driving ratios, and a direct or one-to-one driving ratio, in the planetary units.

A further object is to provide a drive axle with a pair of planetary drive units, concentric with the axle shafts and compactly located either side of the drive shaft and operable to selectively transmit power from the drive shaft to the axle shafts at three different speed ratios.

Another object is to provide a drive axle having a rotatable structure to which power is applied, and embodying two substantially similar planetary units, one of which has its orbit gear connected to the rotatable structure and the other having its planet carrier connected to the rotatable structure, and having control means for causing it to transmit power at either an overdrive or an underdrive ratio through the planetary units.

A further object is to provide a drive axle having two planetary drive mechanisms and means for selectively causing them to transmit power at two different speed ratios and for also causing them to transmit power simultaneously in direct or one-to-one driving ratio.

The invention further aims to provide, in a planetary drive axle, novel lubrication means; novel control means; and improved planetary gear units, including novel design and journalling of the parts so as to render the unit rugged and insure adequate support for the parts under all conditions of load.

Further objects of the invention will become apparent as the specification proceeds in connection with the annexed drawing, and from the appended claims.

In the drawing:

Figure 1 is a longitudinal sectional view through a drive axle embodying the power transmission mechanism of the invention, and shows the operating levers in the positions they assume when mounted on their shafts externally of the housing; and, Figure 2 is a fragmental sectional view, taken substantially on the line 2—2 of Figure 1, looking in the direction of the arrows.

With continued reference to the drawing, wherein like reference characters have been employed to designate like parts throughout the several views thereof, the invention is illustrated as being embodied in a drive axle construction, in which power is applied to a drive pinion A, which through a ring gear drives a housing like structure B, and from there the power if selectively transmitted either through an underdrive unit C or an overdrive unit D to a pair of axle shafts E, and, as will be hereinafter pointed out, both the units may be also shifted into direct drive to transmit power in a one-to-one ratio through the planetary units, when desired.

A main housing 10, split transversely into two sections in well-known manner, has end walls 11 and 12, to which combined bearing race supports and clutch members 13 and 14, respectively, are secured by a plurality of studs and nuts 15. Members 13 and 14 are provided with a plurality of internal teeth 16 and 17, respectively, for selectively locking the sun gears against rotation, in a manner to be hereinafter pointed out.

The novel power transmitting units of the invention are carried by a casing which is mounted for rotation in anti-friction bearings 18 and 19, carried in supports 13 and 14, respectively. The casing or rotatable structure is made up of a planet carrier 21 and a central section 22, detachably secured together by a plurality of stud and nut assemblies 23. The right hand end of member 22 is secured to an internal gear 24 and a third housing section 25 by means of a plurality of stud and nut assemblies 26. The internal gear is preferably provided with accurately formed circumferential rims or shallow flanges 27, which are accurately piloted in pilot surfaces 28 and 29 provided on casing sections 22 and 25 respectively. Casing section 25 is supported in an anti-friction bearing 19 carried by support 14.

The casing assembly is accordingly mounted for rotation in the main housing as a unit and cannot undergo axial movement.

Primary drive

Although any suitable form of gear mechanism, such as a worm gear drive or the like, may be employed to transmit power from the engine propeller shaft 31 to casing C, I have shown and preferably employ a simple bevel gear drive.

A pinion shaft 31 carries an integral pinion gear 32, and is journalled in an anti-friction bearing assembly 33 secured in an enlargement 34 on the housing by means of a cage 35 and cap screws 36. Lock nuts 37 are adjustably threaded on the shaft to afford the proper bearing clearance. The inner end of the shaft is supported in an outboard bearing 38 carried in a strut 39 formed on the inner wall of housing 10.

The bevel pinion meshes with a ring gear 41 secured to a flange 42 on casing section 22 by means of stud and nut assemblies 43.

Differential mechanism

The differential unit is built directly into a casing 45, which forms part of both the underdrive and overdrive mechanisms, as will be hereinafter described. A differential spider 46, carrying differential pinions 47, is mounted in casing 45, the casing being split in any well-known manner to facilitate assembly and disassembly of the spider and pinions. Gears 47 mesh with differential side gears 48 and 49 carried by axle shafts E, and divide the power equally between the two axle shafts in well-known manner.

The novel planetary drive of the invention comprises an underdrive and overdrive planetary unit so related to each other and to the other elements of the axle that they may be selectively employed to deliver the entire power output through either an overdrive or an underdrive, and also may be shifted simultaneously into direct drive, so as to divide the power equally between them when operating in a one-to-one ratio. By locating the units either side of the axis of the drive shaft a symmetrical structure is provided which is of compact design and one which does not require a ring gear of enlarged diameter over those used in convenional axles.

Underdrive unit

The driving element of this unit is internal or orbit gear 27, which, as previously pointed out, is rigidly clamped between two sections of the main casing. The internal gear meshes with a plurality of planet gears 51, preferably three, journalled on shafts 52 rigidly mounted in casing 45. The right hand end of casing 45 rotatably supports the hub of side gear 49 and is rigidly secured, at spaced points 50 intermediate planet gears 51, to a ring-like member 53. The latter is journalled in a seat 54 in casing section 25 and carries internal teeth 55. By journalling member 53 in casing section 25, and allowing the left-hand end of casing 45 to ride on the pitch line of the planet gears in the overdrive unit, as will be later described, the parts are ruggedly mounted for coaxial rotation. Casing 45 is also provided with a web like portion 56 which is spaced from the hub of side gear 48, at the other side of the unit. Thrust washers, located either side of the web, are used to limit the extent of axial motion of casing 45 and side gear 48 to the left.

Planet gears 51 mesh with a quill or sleeve-like sun gear member 57, having spaced rows of sun gear teeth 58 and 59, providing a space wider than teeth 55 of member 53. Member 57 is also provided with a third set of teeth 61, which, in the position of the parts as shown, mesh with teeth 17 of the stationary support 14. This locks the sun gear against rotation, so that the planets will be compelled to rotate about their axes when planetation occurs, as will be hereinafter pointed out.

Member 57 is mounted for axial sliding movement as well as for rotation in a bushing 62 in the hub of casing section 25, and is actuated by a shifter fork 63 having pins 64 riding in a groove 65 in member 57.

By providing two spaced rows of sun gear teeth 58 and 59, and a circumferential groove 67 in member 57 sufficiently wide to accommodate teeth 55 on the planet carrier, it is possible to shift the parts from the underdrive ratio directly into direct drive ratio, and thereafter move the parts into neutral position, the latter being employed when the other unit is in the overdrive ratio. Also, by supporting side gear 49 in casing 45, and rotatably mounting the latter in casing section 25, an extremely rugged construction is provided, there being no tendency of the parts to undergo distortion or be damaged in response to high or even unusually severe stresses. Moreover, by accurately piloting internal gear 24 within casing sections 22 and 25, and rigidly clamping it in place, it is possible to make the internal gear serve as a casing section, and yet provide an extremely sturdy construction.

It is to be understood that the grooves in member 57 are of sufficient width to permit disengagement of teeth 61 from teeth 17 before teeth 59 mesh with planet carrier teeth 55, and vice versa, so as to provide a brief neutral or idle position between direct and geared speed. The overdrive unit to be hereinafter described is similarly constructed.

Operation

Assuming that the parts are disposed in the position shown in Figure 1, power is transmitted from propeller shaft 31 through pinion 32 and ring gear 41 to the main casing, the latter being rotated forwardly. Rotation of the casing causes ring gear 24 to effect planetation of planets 51 about stationary sun gear teeth 58 and 59, the latter being held against rotation through engagement of teeth 17 with stationary support 14. Teeth 55 of the planet carrier merely idle in groove 67, and planet shafts 52 are accordingly rotated forwardly, carrying casing 45 with them. The latter, acting through gears 48, 49 divides the power equally between axle shafts E.

With the parts operating in a manner just described, power is transmitted between casing B and shafts E through an underdrive, and although any gear ratio suitable for the application of the axle may be used, in the axle shown, the ratio is approximately .72 to 1, which, in combination with the reduction effected by the ring gear and pinion, provides adequate torque for extremely heavy loads.

When member 57 is shifted to the right sufficiently to disengage teeth 61 from teeth 17, sun gear teeth 59 are then brought into mesh with teeth 55 of the planet carrier. Under these conditions the planets are locked to their carrier so they cannot rotate about their axes. They are accordingly confined to planetation, only. Therefore, when casing B is rotated under these conditions, internal gear 24 effects forward planetation of the planet gears, and since they cannot rotate about their axes, they effect synchronous rotation of casing 45 and establish a 1-to-1 or direct driving relationship between casing B and shafts E.

Upon shifting member 57 further to the right, into its limiting position, teeth 59 are disengaged from teeth 55 and the space between sun gear teeth 58 and 59 is brought into registry with teeth 55 of the planet carrier. The mechanism is accordingly in "neutral." Although with the parts in this condition ring gear 24 may effect rotation of planets 51, and the latter produce rotation of sleeve 57, the parts merely idle and no driving torque is applied to casing 45. As will be hereinafter pointed out, the parts are automatically placed in neutral position by the control mechanism whenever the other unit is taking the drive through an overdrive ratio.

Overdrive unit

This unit is somewhat similar to the one previously described except that the relationship of the driving and driven parts is reversed, the power being applied to the planet shafts rather than to the internal or orbit gear.

Rigidly secured to the left-hand end of casing 45, by means of stud and nut assemblies 72, is an internal gear 73, which meshes with planet gears 74 carried by shafts 75. Shafts 75 are rigidly secured in casing section 21 and are consequently bodily rotatable therewith. The outer ends of shaft 75 are mounted in a ring-like member 76 which has bosses rigidly secured to matching bosses on section 21 intermediate the planet assemblies, as indicated by the dotted lines. Member 76 is provided with a hub-like portion 77, in which is journalled the hub of differential side gear 48. Casing section 21 rigidly supports member 76, but I have found that, rather than journal web 56 upon the hub of side gear 48, better support for casing 45 is afforded by providing a large clearance in web 56, and allowing internal gear 73 to "float" or ride on the pitch lines of planet gears 74. This provides a maximum axial spacing of the two points of support for the casing. The casing is accordingly accurately mounted for rotation in the structure, upon the planets at one end, and within structure 25 at the other.

Planet gears 74 mesh with two rows of sun gear teeth 78 and 79 carried by a sleeve member 81, the space between the teeth being wider than internal teeth 82 provided on casing section 21. Sleeve member 81 is also provided with teeth 83, which are adapted to be meshed with teeth 16 of support 13, to lock the sleeve against rotation.

The sleeve is journalled in a bushing 80 in planet carrier 21 and shifted axially into its various operative positions in a manner similar to the manner previously described, by means of a yoke member 85, having pins 86 coacting with a groove 87 in the sleeve.

Operation

With the parts disposed in the position shown in Figure 1, and with shaft 31 rotating as previously described, internal gear 73 drives planets 74 and the planets also rotate sleeve 81 through sun teeth 79, but no power is transmitted because under these conditions the planet carrier teeth 82 are merely idling in the space between the two rows of sun teeth.

Shifting member 81 to the right, sufficiently to engage teeth 78 with teeth 82 of the casing or the planet carrier, locks the planets so that they cannot rotate about shafts 75. Under these conditions, the power is transmitted to casing 21, shafts 75 and then through the teeth of the locked planets 74 to internal gear 73, and then is transmitted through casing 45 and the differential unit to the axle shafts. The parts accordingly operate under these conditions in a 1-to-1 driving relationship, and as will be hereinafter pointed out, control means are provided for shifting both units into direct drive simultaneously.

Assuming now that sleeve 81 is shifted into its extreme right hand position, so as to engage teeth 83 with teeth 16 of stationary member 13, the sun will be locked against rotation and sun teeth 78 and 79 will mesh with the planets. Under these conditions rotation of planet carrier 21 causes shafts 75 to roll planets 74 around the stationary sun gear teeth 78 and 79 and drive internal gear 73 at a greater speed than casing 21, or in an overdrive ratio. Casing 45 transmits the power through the differential to the propeller shafts in the manner previously described.

In view of the foregoing, it is apparent that I have provided an extremely simple, compact and rugged drive axle embodying concentrically disposed, selectively operable underdrive and overdrive planetary units, and by locating the units either side of drive shaft 31, housing structure C may be made of minimum diameter without sacrificing strength.

By means of the novel control mechanism now to be described, the operation of the two units is correlated so that either unit may operate in geared speed or both units may be simultaneously operated in direct drive, as desired.

Control mechanism

Referring to Figure 1, it is observed that sliding sleeve 81 into its left-hand position, as shown, places the parts in neutral, whereas shifting sleeve 57 into its left-hand position couples the sleeve to the casing and places the unit in geared drive. Similarly, shifting sleeve 81 into its right-hand position places the unit in geared drive whereas shifting sleeve 57 into its right-hand position places it in neutral. Shifting either sleeve into its mid-position places the units in direct drive. The two sleeves are preferably actuated by the following mechanism.

As previously pointed out, control forks 63 and 85 are slidably and rotatably connected to the sleeves. The forks are secured to shafts 91 and 92 respectively, and each shaft rigidly carries an actuating arm 93 and 94 respectively. As viewed in Figure 1, levers 93 and 94 are disposed above the plane of the section, as to make them appear in this view, it being understood that the casing is entirely closed except for the inspection covers 95 and 96. Shafts 91 and 92 are located in two aligned bores in the casing, and each projects above the top of the housing 10. The levers are secured to the projecting ends of the shafts, so as to locate them exteriorly of the casing. Each lever pivotally carries a connector 97, to which a link member 98 is threadedly connected, the parts being held in adjusted position by locknuts 99. Levers 93 and 94 are preferably the same length, and link 98 is adjusted to place the levers at the same angle, so that movement of one lever will produce a substantially equal angular movement of the other lever. If desired, however, one may slightly lag the other to facilitate shifting the units into direct drive. Also, the entering ends of the various clutch and gear teeth may be shaped in any well known suitable manner to facilitate meshing thereof without departing from the spirit of the invention.

The levers may be actuated by any suitable means, for instance they may be operated by a central lever in the cab of the vehicle in which the drive mechanism is used, and having an underdrive, a direct drive, and an overdrive position. I have shown a lever 101 rigidly mounted on shaft 92, to which the actuating mechanism may be connected. Also, a three-position vacuum, hydraulic or pneumatic mechanism may be used for shifting lever 101, it being understood that the invention is not limited to any particular form of actuating mechanism.

Lever 101 is shown in its extreme clockwise position, with the underdrive unit operating in its underdrive ratio, as previously described. Moving lever 101 into its mid-position will, through lever 94, link 98 and lever 93, move sleeves 57 and 81 into their mid-positions and cause both units to drive in their one-to-one or direct drive ratios and jointly take the load. Moving lever 101 into its lowest position will, through levers 93 and 94 and link 98, move the sleeves into their extreme right-hand positions, and cause the underdrive unit to be shifted into neutral, and the overdrive unit to be shifted into overdrive position.

Lubrication

As seen in Figure 1, a lubricant collecting well or pocket 103 having a drain port 104 is provided on end wall 11 of the gear chamber. It is however illustrated 90° out of proper plane, it being understood that the well will be at the top of the case and would normally not appear in the top sectional view, which is taken along the horizontal plane and looking down on the mechanism.

The pocket 103 is adapted to collect any oil which may be thrown against and adhere to inclined wall 105 of housing 10, and feed it through opening 104, where it gravitates through a passage 104a to bearing 18. A similar pocket 106, having a discharge port 107, cooperates with inclined wall 108 to feed the lubricant to bearing 19 at the other end of the gear chamber, through a passage 107a.

Efficient lubrication of the mechanism contained in the casings is provided by the construction shown in Figure 2. A plurality of pairs of outwardly directed ports 109 are provided in central section 22 of the rotatable casing structure, the lower portion of the casing being constantly immersed in a body of lubricant in the gear chamber in well known manner. Provided at the outer end of each port 109 is an oil scoop or propelling member 110, comprising a sheet metal disc welded or spun in place in a counterbore adjacent each port and so inclined as to throw or deflect lubricant into the port upon rotation of the structure.

Ports 109 are adapted to be aligned during rotation with a series of passages 111 provided in casing 45, so that the lubricant propelled through the ports will be fed to the interior of the casing. During operation in the underdrive or overdrive ratio casings 45 and 22 rotate relatively, so oil delivery to passages 111 will be intermittent, while in direct drive the casings rotate at the same speed. If the casings should be disposed with passages 111 out of registry with ports when the units are shifted into direct drive, the feed of lubricant will be reduced somewhat, but as none of the gears are operating under direct drive conditions, the resulting lubrication is adequate. If desired however ports 109 may be unequally spaced with respect to the passages 111, in the manner of a vernier scale, so that at least one pair of passages will be aligned with a pair of ports in direct drive.

A portion of the lubricant introduced into the casing finds its way into the differential assembly, while part of it is deposited on the interior walls of the central part of casing 45, including an inclined portion 112, which, by reason of the centrifugal force set up through rotation of the structure, propels the lubricant axially into the planetary units. Also, part of the lubricant is fed through the hollow planet shafts 52 and 75 into bores 52a and 75a to the planet gears, insuring positive lubrication thereof. The lubricant system accordingly insures adequate lubrication of all the gears and bearings at all times, it being understood that during rotation annular bodies of lubricant will be centrifugally retained within each end of casing B, so as to afford positive lubrication for the internal gears and planets, and that there will be a certain degree of splash, adequate to lubricate the sun gears and other parts adjacent the axis of the mechanism.

From the foregoing detailed disclosure, it is apparent that the invention provides a novel dual planetary mechanism for drive axles which may be shifted to provide either an overdrive or an underdrive or both units may be operated in direct drive so as to jointly take the load; the mechanism is provided with a simple but efficient control device for insuring proper correlation of the operation of the two planetary units at all times; the rotatable structures are so designed and associated with each other and the differential side gears that all the parts are adequately supported for rotation in accurately coacting relationship at all times and will resist all distorting forces set up during operation, even under severe service conditions; and that simple and efficient means are provided for insuring adequate lubrication of all the working parts during operation.

It is to be understood that, although I have shown the invention as being incorporated in an axle having a transversely split housing, it is to be understood that if desired a so-called "carrier" type construction may be employed, in which a one-piece housing is used, in combination with a bolted-on carrier structure which supports the pinion shaft and the entire gear assembly, without departing from the spirit of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, an axle housing comprising a gear chamber and a pair of axle arms carrying axle shafts; a drive shaft journalled in said chamber and carrying a drive gear; a structure mounted for co-axial rotation with said axle shafts in said chamber and carrying a gear meshing with said drive gear; and planetary gear mechanism operably associated with said rotatable structure for selectively driving said axle shafts at speeds higher or lower than the speed of said rotatable structure.

2. The axle construction defined in claim 1, wherein said planetary gear mechanism comprises two planetary units disposed within said rotatable structure either side of a plane containing the axis of said drive shaft.

3. In a vehicle drive axle, an axle housing having a pair of opposite disposed axle arms each rotatably carrying an axle shaft; a driving member mounted for rotation in cooperative relationship to said axle shafts; a pair of planetary gear units for transmitting power between said driving member and said axle shafts, each unit comprising a sun gear, an orbit gear and a rotatable element carrying planet gears; the orbit gear of one unit and the planet carrying element of the other unit having means operable to couple them for synchronous rotation with said driving member and the planet carrying element of said one unit and the orbit gear of the other unit having means coupling them for synchronous rotation; and means associated with said planetary units for selectively causing said driving member to drive said driven member either through said one unit at an underdrive ratio or through said other unit at an overdrive ratio.

4. The power transmitting mechanism defined in claim 3, wherein the planet carrying element of said one unit and the orbit gear of said other unit are rigidly connected to a housing-like structure mounted for rotation within said driving member.

5. In a vehicle drive axle, an axle housing having a pair of oppositely disposed axle arms; an axle shaft rotatable in each axle arm; a driving member and a driven member mounted for independent rotation in said housing; means for transmitting power to said driving member; means for transmitting power from said driven member to said axle shafts; a pair of planetary drive units for transmitting power between said members, each unit comprising a sun gear, an orbit gear and a rotatable element carrying planet gears; the orbit gear of one unit and the planet carrying element of the other unit being rigidly connected to said driving member; and control means for causing said units to transmit power from said driving member to said driven member at an underdrive or an overdrive ratio, comprising means for selectively axially shifting said sun gears into coupled relationship with said rotatable elements to arrest planetation, or with a stationary member, for locking said sun gears against rotation.

6. The power transmitting mechanism defined in claim 5, wherein said control means is also operable to simultaneously shift said sun gears into coupled relationship to their planet carrying elements, for causing both units to concurrently transmit power between said driving and driven members.

7. In a power transmitting mechanism, a pair of planetary driving units each embodying a sun gear, an orbit gear, and a rotatable structure carrying planet gears meshing with said sun and orbit gears and having internal teeth adapted to be meshed with said sun gear; each sun gear having a further set of teeth adapted to be meshed with a stationary toothed member; actuating means for shifting each of said sun gears axially into selective mesh with either said stationary member or with the internal teeth of said rotatable structure; and control means for causing one of said actuating means to shift one of said sun gears out of mesh with said stationary member whenever the other sun gear is shifted into mesh with said stationary member.

8. The power transmitting mechanism defined in claim 7, wherein said control means is also operable to cause one of said actuating means to shift one of said sun gears into a neutral position whenever the other sun gear is disengaged from the teeth of its rotatable structure.

9. The power transmitting mechanism defined in claim 7, wherein said actuating means comprises a forked lever associated with each of said sun gears and said control means comprises an interlocking device interconnecting said levers for synchronous rocking movement.

10. In a drive axle, a housing having a pair of oppositely disposed axle arms; axle shaft means in said axle arms; an outer casing mounted for rotation in said housing and having: an external driven gear; a plurality of planets; and a set of internal clutch teeth adjacent one end; and an internal ring gear at its other end; a driving gear mounted for rotation in said housing and meshing with said external driven gear; an inner casing journalled in said outer casing and having an internal ring gear meshing with the planets of said outer casing and carrying a plurality of planets meshing with the internal ring gear of said outer casing and also having a set of clutch teeth adjacent its planets, said inner casing also having drive means for transmitting power to said axle shaft means; a set of stationary clutch teeth in said housing adjacent each end of said outer casing; and a member mounted for rotation and axial sliding movement adjacent each end of said outer casing, each member having: a set of sun gear teeth meshable with the planets of one of said casings; a set of teeth meshable with the internal clutch teeth of one of said casings; and a set of teeth meshable with said set of stationary clutch teeth; and means for shifting said members to effect transmission of power from said driven gear to said drive means at either an underdrive or an overdrive or a one-to-one ratio.

11. The drive axle construction defined in claim 10, wherein said axle shaft means comprises a pair of axle shafts mounted for independent rotation in said axle arms, and wherein said drive means comprises a differential mechanism carried by said inner casing and operable to transmit power from the latter to said axle shafts.

12. The drive axle construction defined in claim 10, wherein said axle shaft means comprises a pair of axle shafts mounted for independent rotation in said axle arms and each carrying a differential side gear, and wherein means carried by said outer casing rotatably supports one of said side gears and means carried by said inner casing rotatably supports the other side gear.

13. In a power transmitting mechanism; a sun gear and an orbit gear mounted for independent rotation about a common axis; a structure rotatable about said axis and having planet gears meshing with said sun and orbit gears, said sun gear being mounted for axial movement and adapted in one position to be meshed with internal teeth provided in said rotatable structure, the teeth of said sun gear also being interrupted intermediate their length to provide a groove sufficiently wide to receive the teeth of said rotatable structure when said sun gear is shifted into another position, said sun gear being provided with a further set of teeth adapted in another shifted position thereof to be meshed with teeth carried by a stationary member, for locking said sun gear against rotation.

14. In a vehicle drive axle, an axle housing comprising a gear chamber and a pair of oppositely disposed axle arms; a drive axle in each axle arm; a driving member mounted for rotation in said housing; means for transmitting power between said member and said axle shafts at several values of torque multiplication, comprising a plurality of planetary driving units operably associated therewith and being selectively controllable to each transmit power between said member and said axle shafts independently in geared speed, said planetary driving units having means so interconnecting parts thereof as to cause all of said units to transmit power between said member and said axle shafts when said units are in direct speed.

LAWRENCE R. BUCKENDALE.